(12) United States Patent
Kawai

(10) Patent No.: US 6,609,033 B1
(45) Date of Patent: Aug. 19, 2003

(54) FIELD PROGRAMMABLE WELDING CONTROLLER

(75) Inventor: Shingo Kawai, Nagoya (JP)

(73) Assignee: Nadex Co. Ltd, Aichi-ken (JP)

( * ) Notice: Subject to any disclaimer, the term of this patent is extended or adjusted under 35 U.S.C. 154(b) by 251 days.

(21) Appl. No.: 09/632,364

(22) Filed: Aug. 3, 2000

(30) Foreign Application Priority Data

| Aug. 3, 1999 | (JP) | 11-220402 |
| Aug. 18, 1999 | (JP) | 11-231028 |
| Aug. 19, 1999 | (JP) | 11-232187 |

(51) Int. Cl.$^7$ .............................................. G05B 19/18
(52) U.S. Cl. ................................ 700/5; 700/2; 700/19; 700/20; 700/18; 700/86; 700/249; 219/130.51; 219/130.31; 219/109; 219/110; 219/132; 219/137; 318/568.11; 901/42
(58) Field of Search ........................... 700/2–5, 19–20, 700/18, 86–88, 23, 11–13, 248–249; 219/130.51, 130.31, 109, 110, 132, 137; 318/568.11; 901/42

(56) References Cited

U.S. PATENT DOCUMENTS

| 4,445,022 A | * | 4/1984 | Mori ....................... 219/125.1 |
| 4,458,132 A | * | 7/1984 | Reynolds et al. ........... 219/114 |
| 4,491,718 A | * | 1/1985 | Cook et al. ............ 219/124.22 |
| 4,503,310 A | * | 3/1985 | van Loon .................... 219/98 |
| 4,578,562 A | * | 3/1986 | Lindstrom et al. ....... 219/125.1 |
| 4,841,113 A | * | 6/1989 | Hamada et al. ............. 219/110 |
| 4,937,419 A |   | 6/1990 | Kolodziej et al. .......... 219/110 |
| 4,985,612 A |   | 1/1991 | Izume et al. ................ 219/116 |
| 5,276,308 A |   | 1/1994 | Hasegawa ................... 219/110 |
| 5,347,105 A |   | 9/1994 | Kawai ........................ 219/110 |
| 5,416,299 A | * | 5/1995 | Tabata et al. .......... 219/130.51 |
| 5,440,092 A |   | 8/1995 | Kawai ........................ 219/110 |
| 5,471,028 A |   | 11/1995 | Kawai ........................ 219/110 |
| 5,483,035 A |   | 1/1996 | Kawai et al. ................ 219/110 |
| 5,589,088 A | * | 12/1996 | Boilard ....................... 219/110 |
| 5,714,733 A |   | 2/1998 | Moro ..................... 219/121.61 |
| 5,726,409 A | * | 3/1998 | Fortmann et al. ........... 219/109 |
| 5,808,885 A |   | 9/1998 | Dew et al. .................. 364/132 |
| 6,011,241 A |   | 1/2000 | Rongo ................... 219/124.34 |
| 6,130,396 A |   | 10/2000 | Hasegawa et al. .......... 219/110 |
| 6,172,803 B1 | * | 1/2001 | Masuda et al. ......... 359/337.12 |
| 6,359,566 B2 | * | 3/2002 | Kawai ........................ 340/589 |
| 6,444,942 B1 | * | 9/2002 | Kawai et al. ................ 219/110 |

FOREIGN PATENT DOCUMENTS

| JP | 5-285672 | 11/1993 | ........... B23K/11/24 |
| JP | 7-108385 | 4/1995 | ........... B23K/11/24 |
| JP | 2514882 | 4/1996 | ........... B23K/11/24 |

OTHER PUBLICATIONS

Co–Pending U.S. Application Ser. No. 09/632,377, Filed Aug. 3, 2000, Welding Control System.

* cited by examiner

Primary Examiner—Ramesh Patel
(74) Attorney, Agent, or Firm—Orrick Herrington & Sutcliffe LLP

(57) ABSTRACT

Welding controller 1 has CPU 1a, ROM1 1b, ROM2 1c and RAM 1d. Programs and data are written into the ROM1 1b and can be rewritten. Sequential welding data is written into the RAM 1d and can be rewritten. A write program for writing programs or data or sequential welding data into the ROM1 1b or the RAM 1d is stored in the ROM2 1c. When a welding control program or data or sequential welding data is input into the CPU 1a from an input device 10 or a computer 12, the CPU 1a executes the write program to write the inputted program or data or sequential welding data into the ROM1 1b or the RAM 1d. Preferably, ROM 1b is an in situ programmable memory, such as a flash memory or EEPROM.

19 Claims, 3 Drawing Sheets

FIELD PROGRAMMABLE WELDING CONTROLLER

BACKGROUND OF THE INVENTION

1. Field of the Invention

The present invention relates to welding machines and, more particularly, to welding controllers that control the operation of the welding machines and that can be easily reprogrammed to change the operation of the welding machine.

2. Background of the Invention

Known resistance welding machines are described, for example, in U.S. Pat. Nos. 4,985,612 and 5,808,885. These prior art welding machines are typically installed in automobile production lines or other assembly lines. A representative hardware architecture for such a known welding machines is shown in FIG. 2. Prior art welding controller 53 for controlling the welding machine may include a central processing unit (CPU) 53a, a memory having a PROM ("programmable read only memory") or EPROM ("erasable programmable read only memory") 53b and a RAM (random access memory) 53c, a switching element 53d such as a transistor or a thyristor, an input/output port (I/O) 53e, and a serial communications port (SIO) 53f.

In such welding controller systems, programs and data are written into the EPROM 53b and sequential welding data are written into RAM 53C. The EPROM 53b generally contains a sequential welding program, a current control program and a communications program. The communications program operates to permit an operator to select the sequential welding program or to input sequential welding data. The sequential welding program permits the operator to change the sequential welding data. Sequential welding data includes the welding time, welding current, and other welding parameters, for the welding operation. The CPU 53a executes programs stored in EPROM 53b based upon the sequential welding data stored in RAM 53c. Further, CPU 53a executes the communications program to write sequential welding data into RAM 53c. The sequential welding data may be input into RAM 53c by an input device 54, as discussed below.

EPROM 53b usually must be erased using a physical process, such shining an ultraviolet light on EPROM 53b. Therefore, EPROM 53b must be physically removed from the welding controller 53 in order to change the programs or data stored in EPROM 53b. Further, new programs and data are written into the EPROM 53b in the following manner:

(1) Programs and data are first prepared using a computer 51 and the new programs and data are transferred to ROM writing device 52;

(2) EPROM 53b is placed in ROM writing device 52;

(3) The programs and data, which have been transferred to ROM writing device 52, are written into EPROM 53b; and (4) EPROM 53b is placed in a socket within the welding controller 53. For example, EPROM 53b is inserted into a ROM socket of printed circuit board 59 that is disposed within a control box 60 as shown in FIG. 3.

The input device 54 is used to input sequential welding data and is connected to connector 54b of the welding controller 53 via a cable 54a. Input device 54 includes CPU 54c, a memory such as ROM 54d and RAM 54e, a keyboard 54f, a display 54g, and a serial communications port (SIO) 54h. The communications program may be executed, for example, using keyboard 54f. Based on the communications program, the sequential welding data input by the input device 54 is transferred to the welding controller 53 through the serial communications ports (SIO) 54h and 53f and is then written into the RAM 53c of the welding controller 53. In the alternative, the operator can manually input the sequential welding data using a touchscreen display 54g.

When starting switch 59 is actuated, CPU 53a controls the welding machine based upon the programs stored in EPROM 53b and sequential welding data in RAM 53c. For example, CPU 53a moves welding electrodes 56 such that workpiece 57 is held between the electrodes 56 under pressure. Further, CPU 53a provides control signals to switching element 53d in order to control the welding current that is supplied to the electrodes 56 via a welding transformer 58.

Typically, welding specifications are changed or additional functions may be required after the welding machine has been installed on an automobile production line or other manufacturing environment. In addition, bugs may exist in the programs or data. In such cases, the programs or data in EPROM 53b must be rewritten. However, according to known welding controllers, in order to rewrite the programs or data in EPROM 53b, EPROM 53b attached to the printed board 59 must be physically removed and replaced with an EPROM having the new programs and data. Thus, in order to replace the EPROM 53b, the following operations are required: the power must be turned off, door 60a of control box 60 is opened, old EPROM 53b is removed, new EPROM 53b placed in the appropriate socket of printed circuit board 59, door 60a is closed, and the power is turned on again.

If a plurality of resistance welding machines (for example, usually about ten) have been installed in an automobile production line or other manufacturing environment, a corresponding number of welding controllers 53 are required to control each welding machine. In order to minimize floor space requirements for the welding control system, control box 60 may be installed in an awkward location and it may be difficult to open and close door 60a. Because of this, the printed circuit board 59 may be disposed near other devices, such as the welding transformer, welding gun or robot controller. In such cases, replacement of EPROM 53b of welding controller 53 may be quite difficult due to space restraints and it may take a long time to replace EPROM 53b. Further, when replacing EPROM 53b, other ICs on the printed circuit board 59 may be electrostatically destroyed or a pin of EPROM 53b may be damaged. Finally, if the factory does not have ROM writing device 52 in order to prepare new EPROM 53b, new EPROM 53b must be prepared elsewhere and then delivered to the factory.

SUMMARY OF THE INVENTION

It is, accordingly, an object of the present teaching to provide welding controllers that overcome some or all of the problems of the prior art.

According to one aspect of the present teachings, a write program for writing programs or data into a first memory is stored in a second memory. When welding operation programs or sequential welding data is input into the CPU from external equipment, the CPU executes the write program to write the inputted program or data into the first memory. Thus, welding operation programs or sequential welding data can be easily written into the first memory from an external source without replacing the first memory. Preferably, the CPU may execute a write operation when a predetermined writing command is input from the external source.

According to another aspect of the present teachings, the CPU may control the welding machine when a mode select switch is set for a welding mode. In addition, the CPU may execute a write operation when the mode select switch is set for a writing mode. Therefore, even when the welding mode switch is set to the welding mode and a predetermined writing command is input into the CPU from the external source, the CPU preferably may execute the write operation. In this case, welding operation programs or sequential welding data can be written into the first memory from the external source at any time, irrespective of the selected mode. Further, if a predetermined writing command is input into the CPU from the external source while the CPU is executing a program to control the welding operation, the CPU may preferably complete the welding control instructions before executing the write operation. As a result, the occurrence of welding defects can be prevented or reduced.

In another aspect of the present teachings, the CPU may determine whether welding operation programs or data have been properly written into the first memory. Thus, any improperly written program or sequential welding data can be re-written into the first memory and programs or sequential welding data can be reliably written into the first memory. Preferably, the CPU verifies the written programs and data in the first memory using a parity check or checksum program. In this case, the CPU can easily determine whether programs or data has been properly written into the first memory.

Additional objects, features and advantages of the present invention will be readily understood after reading the following detailed description together with the accompanying drawings and the claims.

The above and other preferred features of the invention, including various novel details of implementation and combination of elements will now be more particularly described with reference to the accompanying drawings and pointed out in the claims. It will be understood that the particular methods and circuits embodying the invention are shown by way of illustration only and not as limitations of the invention. As will be understood by those skilled in the art, the principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION OF THE DRAWINGS

Figure 1:
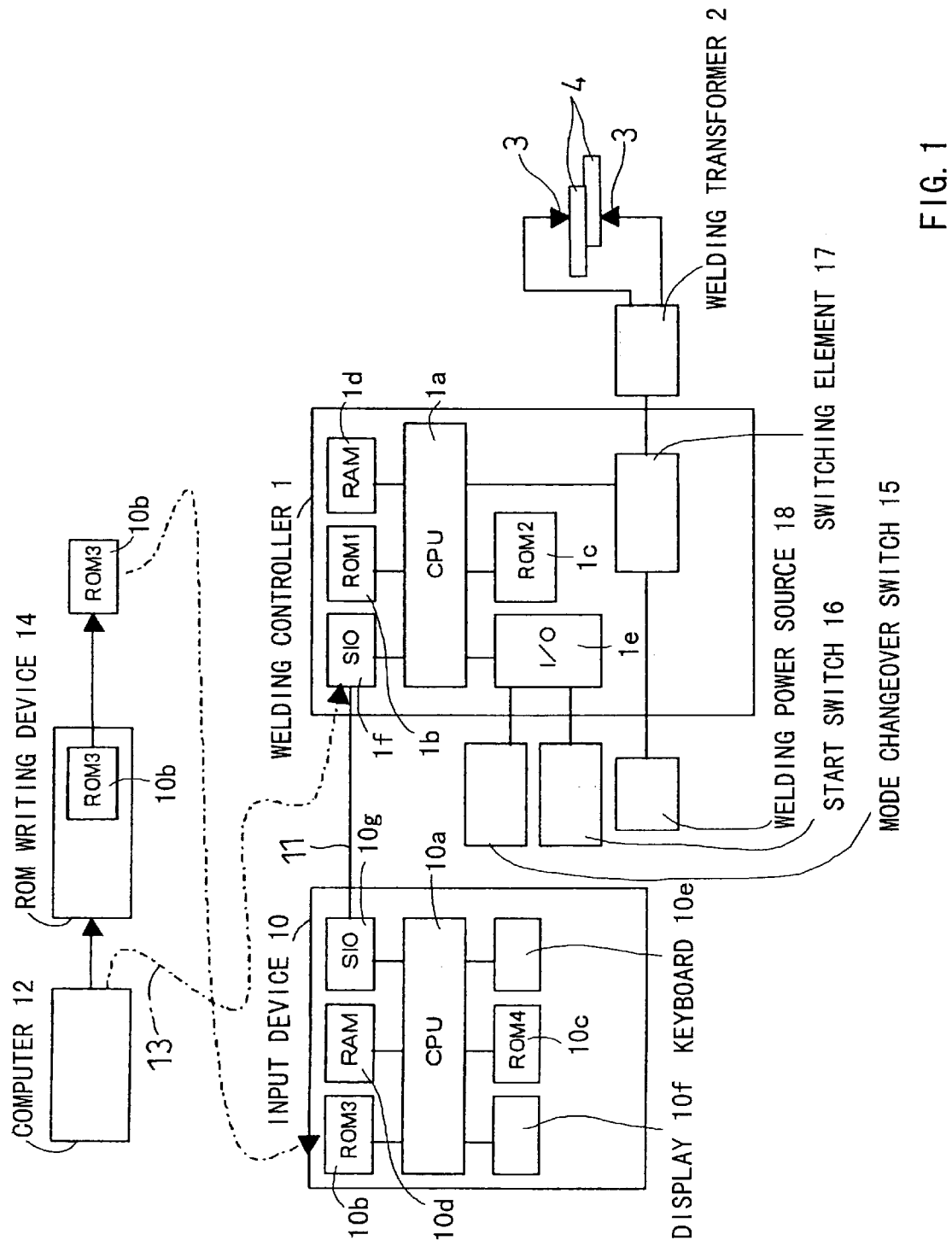
FIG. 1 is a block diagram of a welding controller according to a first representative embodiment of this invention.
Figure 2:
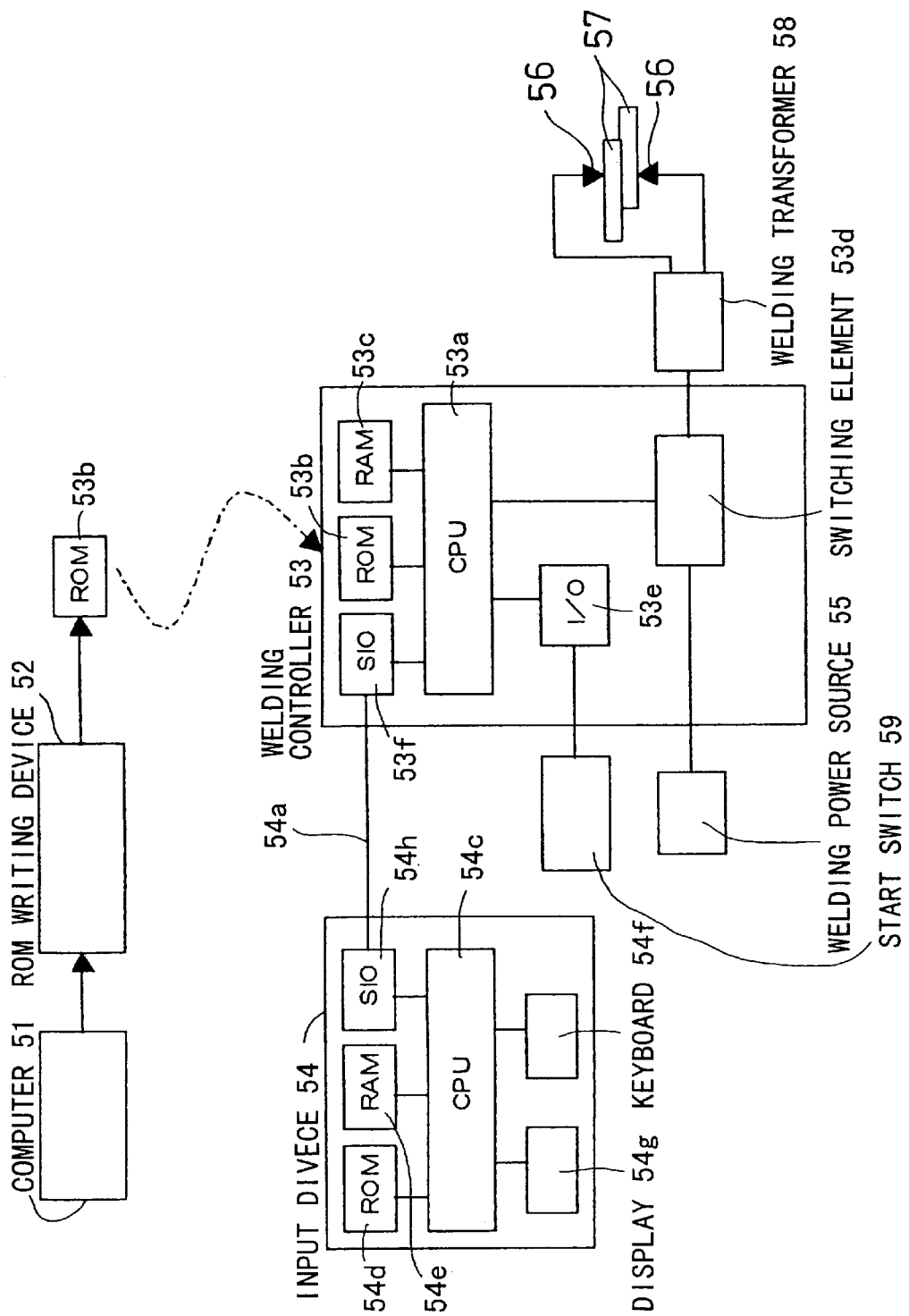
FIG. 2 is a block diagram of a known welding controller.
Figure 3:
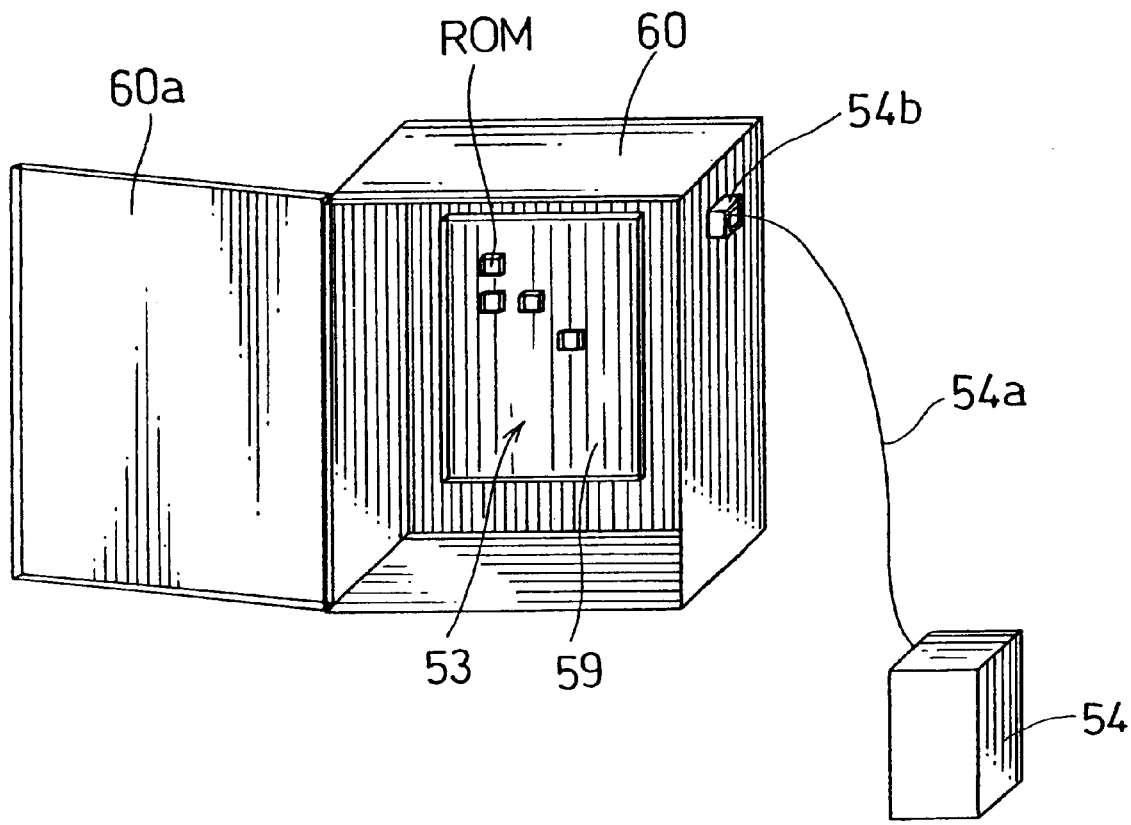
FIG. 3 is a view showing connections between the known welding controller and an input device.

Turning to the figures, the presently preferred apparatus and methods of the present invention will now be described.

Welding controller are taught that may include a CPU, a first memory and a second memory. Welding operation or control programs or sequential welding data may be re-programmably written into the first memory. Preferably, the CPU is adapted to execute welding control programs written into the first memory. The second memory may store a write program adapted to write welding operating programs or sequential welding data into the first memory. When operating programs or data are input into the CPU from an external source, the CPU may preferably execute the write program to write the inputted program or data into the first memory.

Preferably, the first memory comprises a flash memory device such as a flash EPROM. Further, the CPU may execute the write operation when a predetermined writing command is input from an external source. Thus, a write program can be written from an external source.

The welding controller may also include a mode select switch. In that case, the CPU may execute a welding control program when the mode select switch is set to the welding mode. In addition, the CPU may execute the write operation when the mode select switch is set on a writing mode. Preferably, even if the mode select switch is set to the welding mode, the CPU may execute the write operation if a predetermined writing command is input into the CPU from an external source. Further, if a predetermined writing command is input into the CPU from the external source when the CPU is executing a welding sequence program, the CPU may preferably complete the execution of the welding sequence program before executing the write operation.

When a write program is input from an external source, the CPU may write the write program into the second memory. In addition, the CPU may determine whether welding operating programs or data have been properly written into the first memory. Any improperly written programs or data may be re-written into the first memory. In order to verify the programs or data, a parity check or checksum program may be utilized.

By executing welding control programs when the mode select switch is set on welding mode and executing write operations when the mode select switch is set on a write or re-write mode, the workload of the CPU can be reduced. Preferably, even when the mode select switch is set to the welding mode, if a predetermined writing command is input from the external source, the write operation may be executed. In this case, programs and/or data can be easily written into the first memory, even from a location remote from the welding controller, and irrespective of the mode selected by the mode select switch. Further, when the predetermined writing command is input from an external source when the CPU is executing a welding control program, the CPU may complete the execution of the welding control program before starting to execute the write operation. Thus, welding control is not interrupted during execution of the welding control program, thereby providing reliable welding conditions.

Each of the additional features and method steps disclosed above and below may be utilized separately or in conjunction with other features and method steps to provide improved welding controllers and methods for designing and using such controllers. Representative examples of the present invention, which examples utilize many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention.

FIG. 1 is a block diagram showing a first representative embodiment of resistance welding machine using a representative welding controller 1. This resistance welding machine may hold several variable thickness workpieces 4 by and between welding electrodes 3 under pressure and may supply a welding current to the electrodes 3 to thereby weld the workpiece 4.

Welding controller 1 may include, for example, a central processing unit (CPU) 1a, a memory such as ROM1 1b, ROM2 1c and RAM 1d, an input/output port (I/O) 1e, a serial communications port (SIO) 1f, and a switching element 17.

Programs and data may be written into ROM1 1b, which programs may include a communications program, a current control program and a welding program. The communications program is used to receive programs and data to be written (or rewritten) into ROM1 1b or to receive sequential welding data to be written into RAM 1d through communications with an input device 10 and a computer 12.

A writing control program and a mode discrimination program may be stored in ROM2 1c. The writing control program may be used to initially write a program or data in ROM1 1b or to rewrite an already-existing program or data into the ROM1 1b. The mode discrimination program is used to discriminate whether a mode changeover switch 15 is set to a welding mode or a writing mode.

CPU 1a operates based on the welding program when the welding mode is selected and operates based on the writing control program when the writing mode is selected. ROM1 1b and ROM2 1c are preferably selected from EEPROM (electrically erasable programmable read only memory), flash memory and other reprogrammable memory devices that can be erased and reprogrammed without removal from the printed circuit boards. An operator may input sequential welding data, such as welding time and welding current, using input device 10 and computer 12, which sequential welding data is written into RAM 1d.

Input device 10 can write (or rewrite) programs or data (such as sequential welding data) by connecting a serial communications port (SIO) 10g of input device 10 to serial communications port (SIO) If of welding controller 1 by means of cable 11. Further, computer 12 can write programs or data (such as sequential welding data) by connecting computer 12 to serial communications port (SIO) 1f of welding controller 1 by means of cable 13.

Using keyboard 10e, input device 10 can be used to input programs or data or sequential welding data and then to transmit the same to welding controller 1. In the alternative, sequential welding data can be manually input using a touch screen of a display 10f. Further, input device 10 may include ROM3 10b, in which programs or data are stored, and input device 10 may also transmit the programs or data recorded in ROM3 10b to welding controller 1. In this case, programs or data prepared using computer 12 may be, for example, transmitted to a ROM writing device 14 and written into ROM3 10b, which is provided in ROM writing device 14. ROM3 10b can then be inserted into a specified ROM socket of input device 10. Programs for inputting programs or data or sequential welding data and transmitting the same to welding controller 1 preferably may be stored in ROM4 10c.

A mode changeover switch 15 and a start switch 16 are connected to input/output port (I/O) 1e of welding controller 1. Mode changeover switch 15 may be utilized to select the welding mode in order to execute a welding control program or to select the writing mode in order to execute a write program. When the start switch 16 is closed, CPU 1a executes the welding control program based on the sequential welding data to control the operation of switching element 17, welding transformer 2 and welding electrodes 3.

Switching element 17 is coupled to CPU 1a and preferably controls the amount of current that is supplied from a welding power source 18 to a primary winding of a welding transformer 2.

A representative method for using welding controller 1 will now be explained. When power is supplied to welding controller 1, CPU 1a determines whether mode changeover switch 15 is set on the writing mode or the welding mode. If the writing mode has been selected, CPU 1a executes the write program that is stored in ROM2 1c. CPU 1a further determines whether information, such as programs or data or sequential welding data (including a writing command), are being input through serial communications port (SIO) 1f based on the write program.

Information transmitted from input device 10 or computer 12 is input into serial communications port (SIO) 1f. Input device 10 transmits information that has been directly input using keyboard 10e. Further, input device 10 can also transmit programs or data that have been written into ROM3 10b.

When information is input into serial communications port (SIO) If, CPU 1a determines whether the inputted information should be written into ROM1 1b or into RAM 1d. This determination is based, for example, on a writing command transmitted from input device 10 to computer 12. For example, input device 10 or the computer 12 may transmit a program rewriting command when transmitting a program or data, and may transmit a data rewriting command when transmitting sequential welding data.

When CPU 1a determines that the inputted information should be written into ROM1 1b, such information is written into ROM1 1b. This write operation will be an initial write operation if no program or data is already stored in ROM1 1b. On the other hand, if a program or data has already been stored in ROM1 1b, this write operation will cause the previously written program or data to be rewritten, which is a significant improvement over prior art devices.

When CPU 1a determines that the inputted information should be written into RAM 1d, such information is written into RAM 1d. On the other hand, when mode changeover switch 15 is set on the welding mode, CPU 1a executes the welding control program stored in ROM1 1b based on the sequential welding data stored in RAM 1d to control the operation of the welding machine.

In the first representative embodiment, programs, data or sequential welding data are preferably written when the writing mode is selected. However, in a second representative embodiment, which will now be explained, programs, data or sequential welding data can be written even while the CPU is controlling the operation of the welding machine.

In the second representative embodiment, when mode changeover switch 15 is set on the welding mode, CPU 1a executes the welding program stored in the ROM1 1b based upon the sequential welding data in the RAM 1d to control the welding operation of the welding machine. CPU 1a may also execute a communications program at the same time. For example, the CPU 1a may determine whether information has been input to serial communications port (SIO) 1f at a certain time during execution of the welding control program.

If the information has been input from the input device 10 or the computer 12, the write program stored in ROM2 1c is executed and the inputted information is written into ROM1 1b or RAM 1d. However, if a welding sequence is being executed when a writing command that informs CPU 1a that input information has been received, the write program is not executed until the welding sequence is completed. Upon completion of the welding sequence, the write program is executed and programs, data or sequential welding data is written into ROM1 1b or the RAM 1d. In this case, a standby command may be transmitted to input device 10 or computer 12. Upon completion of the welding sequence, a transmission command may be transmitted to input device 10 or computer 12. Alternatively, programs, data or sequential welding data transmitted from input device 10 or computer 12 may be written into the RAM 1d. Upon completion of the welding sequence, such information may be then written into ROM1 1b.

In some cases, programs or data or sequential welding data transmitted from input device 10 or computer 12 cannot be properly written into ROM1 1b or RAM 1d. In such a case, the programs or data or sequential welding data must be written again or received again from input device 10 or computer 12.

Therefore, CPU 1a preferably has the ability (this ability may come from software or firmware) to determine whether programs or data or sequential welding data have been properly written into ROM1 1b and the RAM 1d. For example, such determination may be performed using a parity check or checksum program, as is well known the art, for the programs or data or sequential welding data written into ROM1 1b or RAM 1d. If the programs or data or sequential welding data have errors, the ROM1 1b or RAM 1d can be erased, and the correct programs and data can be then written into ROM1 1b or RAM 1d. The write operation may be repeatedly performed until the parity check or checksum program indicates that the program, data or sequential welding data has been properly written.

Alternatively, when the programs or data or sequential welding data cannot be properly written even if the write operation has been repeated a predetermined number of times, retransmission of such programs or data or sequential welding data may be requested.

The present invention is not limited to the constructions that have been described as the representative embodiments, but rather, may be added to, changed, replaced with alternatives or otherwise modified without departing from the spirit and scope of the invention. For example, while the write program has been described as being stored in ROM2 1c, it may also be stored in another memory, such as ROM1 1b or RAM 1d. Further, the write program may be rewritable. In this case, for example, the write program that is stored in ROM2 1c is used at the time of the first write operation. Thereafter, the write program is rewritten when a new write program is received. Further, welding controller 1 can be also utilized with various other welding machines in addition to resistance welding machines. Moreover, in order to transmit programs or data or sequential welding data from input device 10 or computer 12 to welding controller 1, the data may be transmit via other sources, such as for example radio signals or the Internet. In this case, programs or data or sequential welding data can be written or rewritten from a location that is remote from the welding controller. Finally, the CPU may be any kind of general purpose or dedicated processor that is capable of executing welding control programs.

Other teachings relevant to the present teachings can be found in U.S. Pat. Nos. 5,483,035, 5,471,028, 5,440,092, 5,347,105 and 5,276,308, which patents are hereby incorporated herein by reference in their entirety. Further relevant teaching can be found in a US Patent Application, the serial number of which has not yet been assigned, which was filed on the same date as the present application and claims priority to Japanese application number 11-231028 filed Aug. 18, 1999, Japanese application no. 11-232187 filed Aug. 19, 1999, Japanese application number and Japanese application no. 11-220402 filed Aug. 3, 1999, which application names as inventors Shingo Kawai and Satoshi Kawamatsu and is identified by Lyon & Lyon attorney docket number 256/036, which US application is also hereby incorporated herein by reference in its entirety.

Thus, a preferred method and apparatus for welding has been described. While embodiments and applications of this invention have been shown and described, as would be apparent to those skilled in the art, many more embodiments and applications are possible without departing from the inventive concepts disclosed herein. The invention, therefore, is not to be restricted except in the spirit of the appended claims.

What is claimed is:

1. A welding controller comprising:
   a processor,
   a first memory coupled to the processor, wherein the processor is adapted to operate based upon a welding operation computer program stored in the first memory, wherein the first memory is re-programmable, and
   a second memory coupled to the processor, the second memory containing a write computer program adapted to write computer programs or data into the first memory, wherein the processor is adapted to execute the write computer program when a computer program or data is input into the welding controller from an external source.

2. A welding controller as in claim 1, wherein the first memory comprises a flash memory.

3. A welding controller as in claim 1, wherein the processor is adapted to execute a write operation when a predetermined writing command is inputted from an external source.

4. A welding controller as in claim 1, further comprising a mode select switch, wherein the processor is adapted to execute the welding operation computer program when the mode select switch is set on a welding mode, and the processor is adapted to execute a write operation when the mode select switch is set on a writing mode.

5. A welding controller as in claim 4, wherein the processor is adapted to execute the write computer program even when the mode select switch is set on the welding mode, if a predetermined writing command is input into the processor from an external source.

6. A welding controller as in claim 5, wherein the processor is adapted to complete the execution of the welding operation computer program before starting to execute the write operation if a predetermined writing command is inputted into the processor from an external source when the processor is executing the welding operation computer program.

7. A welding controller as in claim 1, wherein the processor is adapted to write the write computer program into the second memory when the write computer program is inputted from an external source.

8. A welding controller as in claim 1, wherein the processor is adapted to verify computer programs or data stored in the first memory and is adapted to re-write into the first memory any improperly written computer program or data.

9. A welding controller as in claim 8, wherein the processor is adapted to execute a parity check program to verify the computer programs or data stored in the first memory.

10. A welding controller as in claim 1, further comprising a mode select switch and the first memory comprises an in situ programmable memory, wherein the processor is adapted to:
   (a) execute a write operation when a predetermined writing command is inputted from an external source,
   (b) execute the welding operation computer program when the mode select switch is set on a welding mode,
   (c) execute a write operation when the mode select switch is set on a writing mode,
   (d) execute the write computer program even when the mode select switch is set on the welding mode, if a predetermined writing command is inputted into the processor from an external source,
   (e) complete the execution of the welding operation computer program before starting to execute the write operation if a predetermined writing command is inputted into the processor from an external source when the processor is executing the welding operation computer program,
   (f) write the write computer program into the second memory when the write computer program is inputted from an external source,
   (g) verify computer programs or data stored in the first memory using a parity check computer program, and
   (h) re-write into the first memory any improperly written computer program or data.

11. A welding controller as in claim 10 wherein the first memory is an electrically erasable programmable read only memory.

12. A welding controller as in claim 10, wherein the first memory is a flash memory.

13. An apparatus comprising:
   welding electrodes,
   a welding transformer coupled to the welding electrodes,
   a switch coupled to a power supply and the welding transformer,
   a processor coupled to the switch,
   a first memory coupled to the processor and containing a welding control computer program, wherein the processor is adapted to control current supplied to the welding electrodes and movement of the welding electrodes based upon the welding operation computer program, wherein the first memory is an in situ re-programmable memory, and
   a second memory coupled to the processor, the second memory containing a write computer program adapted to write computer programs or data into the first memory, wherein the processor is adapted to execute the write computer program when a new welding control computer program or sequential welding data is input into the processor from an external source.

14. An apparatus as in claim 13, wherein the first memory comprises a flash memory or an electrically erasable programmable read only memory.

15. An apparatus as in claim 13, further comprising a mode select switch, wherein the processor is adapted to execute the welding control computer program when the mode select switch is set on a welding mode, and the processor is adapted to execute a write operation when the mode select switch is set on a writing mode.

16. An apparatus as in claim 15, wherein the processor is adapted to execute the write computer program even when the mode select switch is set on the welding mode, if a predetermined writing command is input into the processor from an external source.

17. An apparatus as in claim 16, wherein the processor is adapted to complete the execution of the welding control computer program before starting to execute the write operation if a predetermined writing command is inputted into the processor when the processor is executing the welding control computer program.

18. An apparatus as in claim 13, wherein the processor is adapted to write the write computer program into the second memory when the write computer program is inputted from an external source.

19. An apparatus as in claim 13, further comprising a mode select switch and the first memory comprises a flash memory, wherein the processor is adapted to:
   (a) execute a write operation when a predetermined writing command is input from an external source,
   (b) execute the welding control computer program when the mode select switch is set on a welding mode,
   (c) execute a write operation when the mode select switch is set on a writing mode,
   (d) execute the write computer program even when the mode select switch is set on the welding mode, if a predetermined writing command is inputted into the processor,
   (e) complete the execution of the welding operation computer program before starting to execute the write operation if a predetermined writing command is inputted into the processor from an external source when the processor is executing the welding control computer program,
   (f) write the write computer program into the second memory when the write computer program is input from an external source,
   (g) verify computer programs or data stored in the first memory using a parity check computer program, and
   (h) re-write into the first memory any improperly written computer program or data.

* * * * *